US012336660B2

(12) United States Patent
Khare et al.

(10) Patent No.: US 12,336,660 B2
(45) Date of Patent: Jun. 24, 2025

(54) FRYING OIL MAINTENANCE

(71) Applicant: Cargill, Incorporated, Wayzata, MN (US)

(72) Inventors: Anil Bhagwan Khare, Minnetonka, MN (US); Steven Hansen, Chanhassen, MN (US); Todd Kurth, Maple Grove, MN (US); Kevin Wirtz, Eden Prairie, MN (US)

(73) Assignee: Cargill, Incorporated, Wayzata, MN (US)

( * ) Notice: Subject to any disclaimer, the term of this patent is extended or adjusted under 35 U.S.C. 154(b) by 204 days.

(21) Appl. No.: 17/604,868

(22) PCT Filed: Mar. 20, 2020

(86) PCT No.: PCT/US2020/023803
§ 371 (c)(1),
(2) Date: Oct. 19, 2021

(87) PCT Pub. No.: WO2020/214329
PCT Pub. Date: Oct. 22, 2020

(65) Prior Publication Data
US 2022/0218151 A1 Jul. 14, 2022

Related U.S. Application Data

(60) Provisional application No. 62/836,302, filed on Apr. 19, 2019.

(51) Int. Cl.
*A47J 37/12* (2006.01)
*A23L 5/10* (2016.01)
*A47J 27/00* (2006.01)

(52) U.S. Cl.
CPC ............ *A47J 37/1261* (2013.01); *A23L 5/11* (2016.08); *A47J 27/004* (2013.01); *A47J 37/1209* (2013.01); *A47J 37/1266* (2013.01)

(58) Field of Classification Search
CPC ..... A23L 5/11; A47J 37/1261; A47J 37/1209; A47J 27/004; A47J 37/1266;
(Continued)

(56) References Cited

U.S. PATENT DOCUMENTS 225,317 A * 3/1880 Ashcroft
763,473 A * 6/1904 Forney
(Continued)

FOREIGN PATENT DOCUMENTS

DE 202011050594 U1 10/2012
EP 0560553 B1 9/1995
(Continued)

OTHER PUBLICATIONS

Frying NPL, chrome-extension://efaidnbmnnnibpcajpcglclefindmkaj/ https://www.cookingscienceguy.com/pages/wp-content/uploads/2012/07/A-Common-Misconception-About-Frying-Food2.pdf (Year: 2012).*
(Continued)

*Primary Examiner* — Drew E Becker

(57) ABSTRACT

Various embodiments provide a method of frying. A method includes heating frying oil to a frying temperature and maintaining the frying oil at the frying temperature for a frying period. During the method no part of the oil exceeds 220° C. A system for using the method of frying includes a pot for holding a frying oil, a heating element for heating the frying oil, and a jacket surrounding the heating element. The jacket prevents direct contact between the frying oil and the heating element. The jacket is configured to uniformly distribute heat produced by the heating element within the pot such that the frying oil has less than 10 area % polymers at the end of heating and maintaining the frying oil at a frying temperature for a frying period.

15 Claims, 7 Drawing Sheets

(58) Field of Classification Search
CPC ................ A47J 37/1257; A47J 37/1214; A47J 36/2405; A47J 37/12–129
See application file for complete search history.

(56) References Cited

U.S. PATENT DOCUMENTS

| | | | | |
|---|---|---|---|---|
| 1,741,569 A * | 12/1929 | Hindman | ............ | A47J 36/2405 219/439 |
| 1,990,351 A * | 2/1935 | Shroyer | ............ | A47J 37/1209 236/20 R |
| 2,032,175 A * | 2/1936 | Jones | ............ | A47J 37/1209 99/413 |
| 2,708,436 A * | 5/1955 | Foster | ............ | A47J 39/00 220/573.1 |
| 2,767,095 A * | 10/1956 | Smith, Jr. | ............ | A23L 5/11 99/403 |
| 2,812,254 A * | 11/1957 | Smith, Jr. | ............ | A47J 37/1214 99/405 |
| 2,934,001 A * | 4/1960 | Cunningham | ...... | A47J 37/1214 99/406 |
| 3,213,778 A * | 10/1965 | Martino | ............ | A47J 37/1266 340/584 |
| 3,274,920 A * | 9/1966 | Benson | ............ | A47J 37/1214 414/373 |
| 3,282,198 A * | 11/1966 | Aho | ............ | A47J 37/12 99/403 |
| 3,376,806 A * | 4/1968 | Magnusson | ......... | A47J 37/1214 99/404 |
| 3,432,642 A * | 3/1969 | Lohr | ............ | A47J 27/004 165/104.19 |
| 4,173,993 A * | 11/1979 | Skala | ............ | F25D 31/005 126/400 |
| 4,603,622 A * | 8/1986 | Beck | ............ | A47J 37/12 210/DIG. 8 |
| 4,704,290 A * | 11/1987 | Fritzsche | ............ | A47J 37/1233 99/403 |
| 4,795,649 A * | 1/1989 | Kearns | ............ | A47J 37/12 426/243 |
| 4,882,984 A * | 11/1989 | Eves, II | ............ | A47J 37/1214 99/406 |
| 5,632,266 A * | 5/1997 | Sato | ............ | A47J 37/12 99/403 |
| 5,801,362 A * | 9/1998 | Pearlman | ............ | F24C 7/087 219/400 |
| 6,777,009 B1 * | 8/2004 | Shealy | ............ | A47J 37/1266 426/523 |
| 7,141,764 B1 * | 11/2006 | Shumate | ............ | A47J 37/1261 219/439 |
| 7,282,673 B2 * | 10/2007 | Sung | ............ | F24C 15/325 219/400 |
| 7,669,520 B2 * | 3/2010 | De'Longhi | ............ | A47J 37/1295 99/336 |
| 7,726,234 B2 * | 6/2010 | Glier | ............ | A47J 36/2483 99/348 |
| 2003/0034027 A1 * | 2/2003 | Yamamoto | ............ | A47J 37/1247 126/344 |
| 2008/0202354 A1 * | 8/2008 | Lee | ............ | F24C 7/082 99/476 |
| 2009/0101023 A1 * | 4/2009 | Kimura | ............ | A47J 37/1223 99/408 |
| 2014/0004234 A1 * | 1/2014 | Mosteller | ............ | A47J 37/1266 99/330 |
| 2014/0251164 A1 * | 9/2014 | Alipour | ............ | A47J 27/10 99/483 |
| 2015/0342392 A1 * | 12/2015 | Wu | ............ | H05B 6/1209 219/448.11 |
| 2021/0321823 A1 * | 10/2021 | Kalling | ............ | A23L 19/18 |

FOREIGN PATENT DOCUMENTS

| | | |
|---|---|---|
| EP | 3125644 B1 | 3/2020 |
| WO | 2011119462 A1 | 9/2011 |

OTHER PUBLICATIONS

Smoke Point NPL, https://chefonaboat.wordpress.com/2019/01/02/smoke-points-for-cooking-oils/ (Year: 2019).*

* cited by examiner

FRYING OIL MAINTENANCE

CROSS REFERENCE TO RELATED APPLICATIONS

This application is a national phase application of PCT/US2020/023803, filed Mar. 20, 2021, which claims the benefit of U.S. Provisional Application No. 62/836,302, filed Apr. 19, 2019, which are hereby incorporated by reference in their entirety.

BACKGROUND

Deep fryers are used commonly for frying food at restaurants, fast food chains, or domestically. Generally, deep fryers include a heating element located in a frying pot containing frying oil, into which a basket with food is inserted for frying. Over consistent use, the heating of the frying oil can cause degradation and oxidation of the frying oil, as well as polymer formation, which can induce oil foaming. Oil foaming can cause unsafe conditions for the fryer operator, resulting in premature disposal of the oil. Additionally, foaming of oil can affect the quality of fried food produced.

To prevent foaming of frying oil, anti-foaming agents are often added to frying oils. Many commercially used anti-foaming agents inhibit the formation of foam on the surface of the frying oil by reducing surface tension. Anti-foaming agents can include oil, powder, water, silicon, and alkyl-type anti-foaming agents. Dimethylpolysiloxane (DMPS) is a common anti-foaming agent use in fast food and restaurant deep fryers. DMPS is commonly found in deep fried foods such as french fries.

SUMMARY OF THE DISCLOSURE

In various embodiments, the present disclosure provides a method of frying including heating frying oil to a frying temperature and maintaining the frying oil at the frying temperature for a frying period. During the method, no part of the oil exceeds 220° C.

In various embodiments, the present disclosure provides a method of heating frying oil with a heating element surrounded by a jacket preventing direct contact between the frying oil and the heating element. The jacket transfers heat from the heating element to the frying oil.

In various embodiments, the present disclosure provides a system for frying including a pot for holding a frying oil, a heating element for heating the frying oil, and a jacket surrounding the heating element. The jacket prevents direct contact between the frying oil and the heating element. The jacket is configured to uniformly distribute heat produced by the heating element within the pot such that the frying oil has less than 10 area % polymers, compared to an HPSEC elution peak or peaks, at the end of heating and maintaining the frying oil at a frying temperature for a frying period.

In various embodiments, the present disclosure provides an apparatus including a heating element, an oil tank and a jacket surrounding the oil tank for transferring heat from the heating element to the oil tank. The jacket prevents direct contact between the heating element and contents of the oil tank.

In various embodiments, the method, system, and apparatus of the present invention can provide various advantages over conventional frying techniques and systems. For example, in various embodiments, the present invention can allow a frying oil to be used for frying with less foaming, less polymer formation, less degradation, less oxidation, or a combination thereof, as compared to frying using conventional frying systems that include direct contact between a heating element and the frying oil or that include heating portions of the oil well above the desired frying temperature. In various embodiments, the present invention can allow a frying oil to be used for frying for a longer period of time before the oil requires replacement with fresh oil. In various embodiments, the present invention can enable the use of frying oils that have less or no anti-foaming agent and can prevent or reduce the foaming of such oils over time as compared to using such oils in a conventional frying system.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
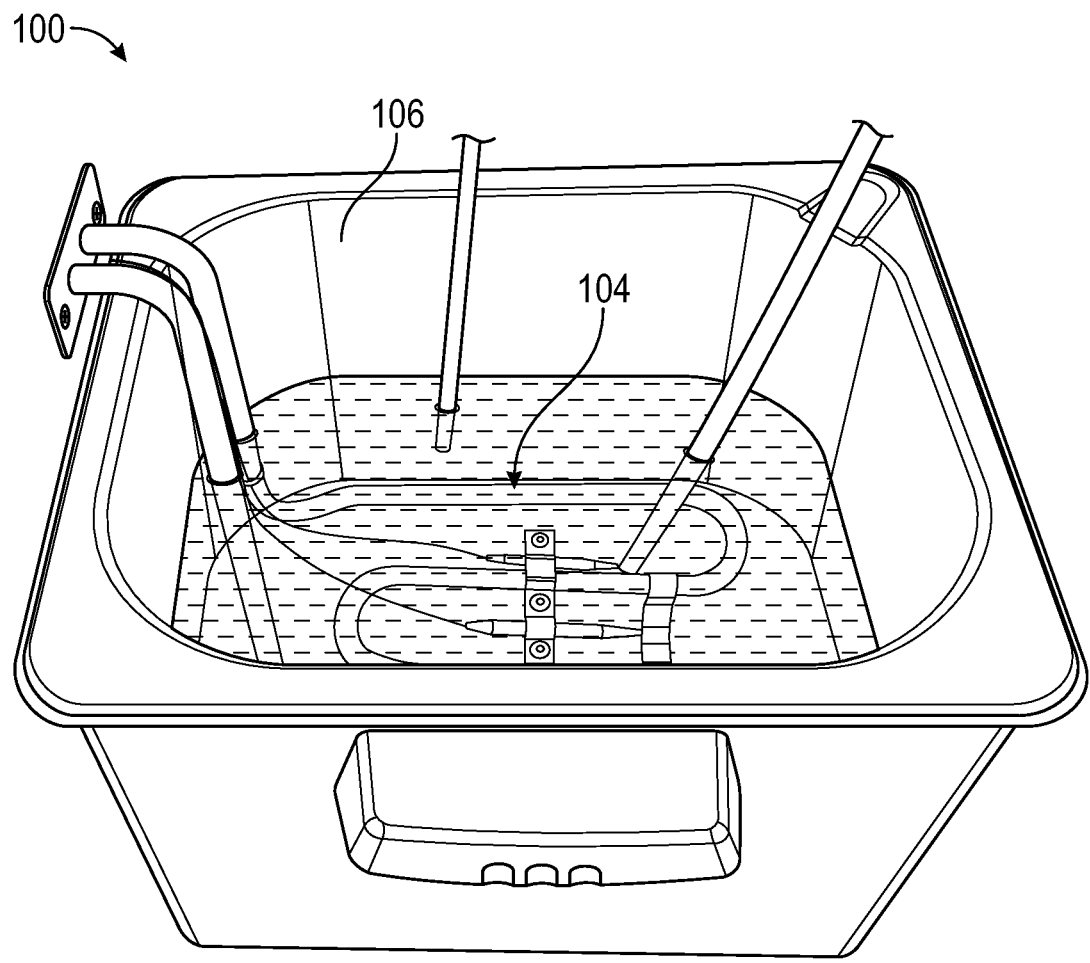
FIG. 1 is a schematic diagram of a prior art fryer system without a jacket.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "light" as used herein refers to electromagnetic radiation in and near wavelengths visible by the human eye and includes ultra-violet (UV) light and infrared light, from about 10 nm to about 300,000 nm wavelength.

Overview

Frying oils can be subject to polymer build-up near a heating element of the fryer system. The polymers can build up in the frying pot and cause foaming, which is dangerous to the fryer operator, at which point the frying oil should be replaced. Foaming can be caused by interaction of moisture in food with the frying oil, and heating of the oil to high temperatures. Reactions such as hydrolysis, oxidation, and polymerization in the frying oil can induce foaming.

Specifically, polymerization of triacylglycerols can be catalyzed by high temperatures within the frying oil. The formation of polymers having higher molecular weight than the frying oil can cause the viscosity of the frying oil to increase over time (however, viscosity differences can be minimized as temperature is increased). The presence of the polymers and water in the frying oil can cause the formation of foam, or small bubbles that slowly creep up the sides of the fryer and causes both safety and fire hazards. On the surface of the frying oil, and on the sides of the fryer, polymers can also form layers that are difficult to remove, often referred to as "gumming."

Restaurants commonly use oils for deep fryer systems that include anti-foaming agents, such as dimethylpolysiloxane (DMPS). In general, anti-foaming agents have surface active properties that prevent foam formation. Anti-foaming agents can be found in many fried foods, such as chicken nuggets and french fries made by restaurants. Consumers may desire fried food that is free of anti-foaming agents. For this reason, an alternative solution to fryer oil foaming is desired.

Fryer System

FIG. 1 is a schematic diagram of a prior art fryer system 100 without a jacket. System 100 includes heating element 104, frying pot 106, and a basket. Prior-art system 100 does not include an anti-foaming agent. Here, heating element 104 can sit within frying pot 106. Frying pot 106 can, for example, be filled with frying oil when system 100 is in use. A basket can, for example, be used to insert food into frying pot 106.

Heating element 104 can be a conventional heating element, such as an electric or gas heating element. Heating element 104 can be used to heat frying oil situated in frying pot 106. Heating element 104 can, for example, heat frying oil to about 180° C. for frying.

Frying pot 106 can, for example, host a frying oil. Frying pot 106 can be metallic or other suitable material to withstand heat from heating element 104. Frying pot 106 can be a suitable shape to hold frying oil and basket 108, optionally with food. Frying pot 106 can be a vat, a tank, or other area that can be shaped to hold frying oil. Frying pot 106 can optional have a lid. The frying oil can be any frying oil suitable to one on the art, such as peanut oil, soybean oil, canola oil, corn oil, cottonseed oil, coconut oil, lard, grapeseed oil, or other similar oils as known in the art.

The basket can be shaped to hold food such as french fries, chicken strips, or other fried food as appropriate. In various embodiments, the basket can have a different shape, have different draining mechanism, be a tray, or includes other means of inserting food into frying pot 106.

In system 100, frying pot 106 can be filled with frying oil. Heating element 104 can be turned on to produce heat within frying pot 106 and heat the frying oil. Food can be fried, for example, by placement in the basket, which can be lowered into the frying oil when hot.

As system 100 is consecutively used, heating element 104 can heat the frying oil in a non-uniform manner. Heating element 104 can heat the frying oil that is adjacent heating element 104 to a higher temperature and heat the oil at the top of frying pot 106 to a lower temperature. The difference in temperature between these areas creates hot and cold spots within the frying oil situated in frying pot 106. This, in turn, can result in uneven frying of food.

Moreover, the high temperature of the frying oil adjacent the heating element 104 can cause polymer formation by catalyzing polymerization of triacylglycerols within the frying oil. Without an anti-foaming agent, the polymer formation and oxidation of the oil induce foaming of the frying oil. The oil should then be replaced with fresh oil to prevent foaming.

Figure 2A:
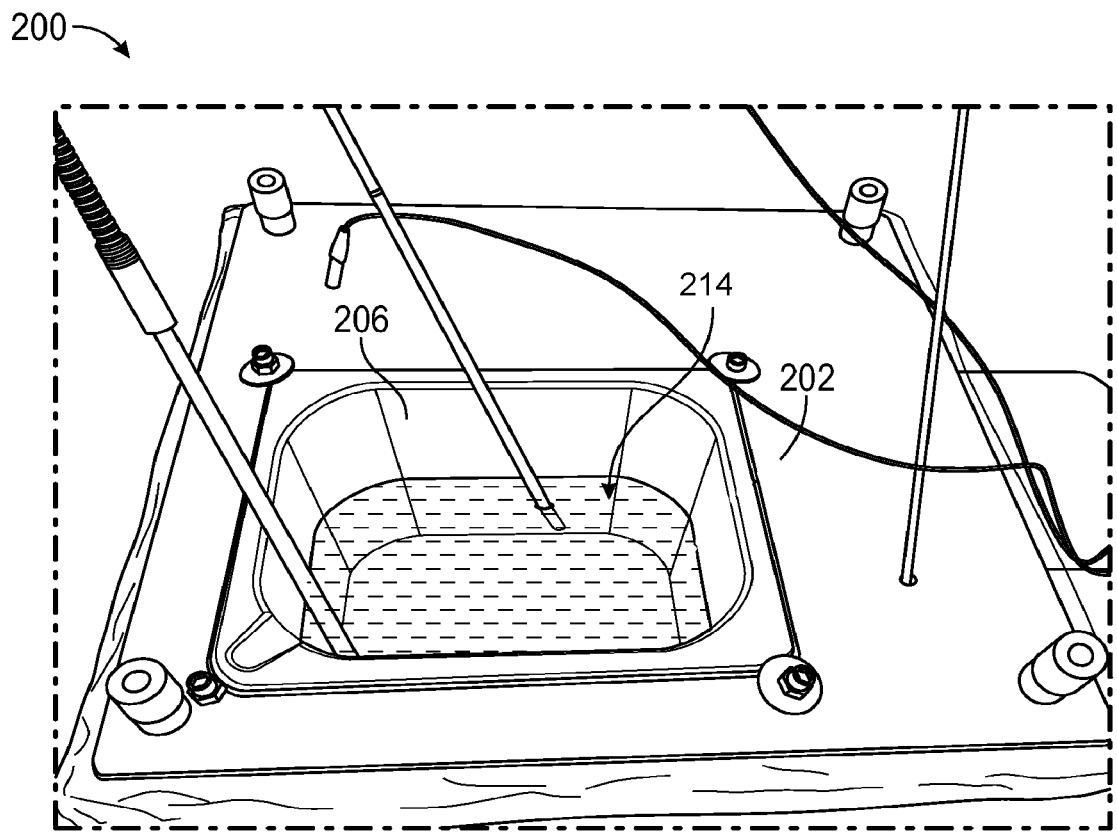
FIG. 2A is a schematic diagram of a fryer system with a jacket according to various embodiments.
Figure 2B:
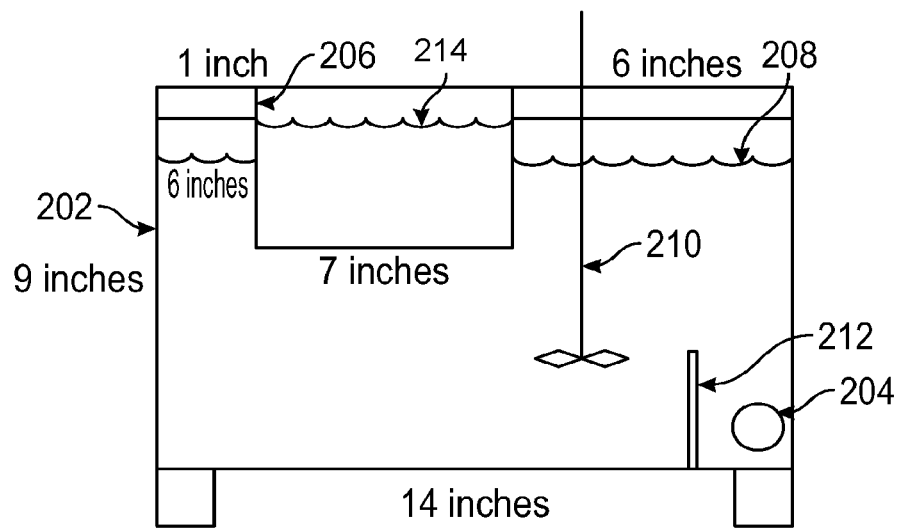
FIG. 2B is a cut-away schematic diagram of a fryer system with a jacket according to various embodiments.
Figure 3:
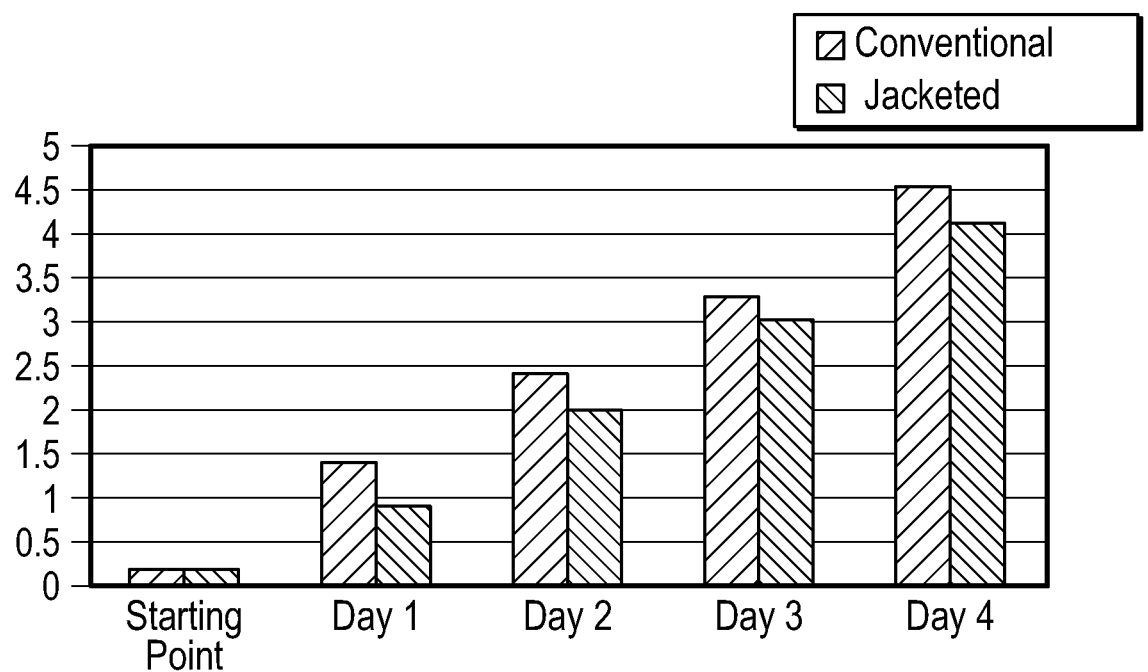
FIG. 3 is a chart comparing polymer formation in a jacketed fryer and a conventional fryer, according to various embodiments.

Various embodiments of the present invention provide a fryer system. FIG. 2A is a schematic diagram of a fryer system 200 with a jacket 202 in various embodiments. FIG. 2B is a cut-away schematic diagram of fryer system 200 with jacket 202 in various embodiments.

System 200 can include jacket 202 on heating element 204, frying pot 206, heating media 208, heating media stirrer 210, baffle 212, and frying oil 214 and optionally a basket. Jacket 202 can surround heating element 204, which can be situated near the bottom of frying pot 206. Frying pot 206 can hold frying oil 214. A basket can be used to place food within frying oil 214 in frying pot 206. Frying pot 206 and the basket can be similar to their counterparts described in reference to FIG. 1.

Various embodiments of the present invention provide a jacketed heating element apparatus. In system 200, heating element 204 can be surrounded by jacket 202. Jacket 202 can be, for example, a metallic material enclosing heating element 204. In some embodiments, jacket 202 can partially cover heating element 204. Jacket 202 can, for example, face the inside of frying pot 206 wherein the frying oil can be placed. Thus, when heating element 204 is producing heat, jacket 202 can disperse the heat evenly from heating element 204 to the frying oil in frying pot 206. Frying oil can optionally flow freely around jacket 202.

FIG. 2B shows one embodiment of jacket 202 enclosing heating element 204, and additionally enclosing heating media 208, heating media stirrer 210, and baffle 212. In FIG. 2B, Heating element 204 can be, for example, a traditional heating element submersed in heating media 208. Heating media 208 can be, for example, a liquid that is thermally conductive so as to transfer heat from heating element 204 through jacket 202 to the frying oil 214. Heating media stirrer 210 can, for example, be activated to stir heating media 208 and allow for even distribution of heat throughout heating media 208, and even distribution of heating media 208 throughout jacket 202. Baffle 212 can optionally be used to mechanically separate heating element 204 from heating media stirrer 210 and the frying pot.

Various embodiments of the present invention provide a method of frying. A method of frying can include uniformly heating a frying oil and frying with that oil for a specific frying period, for example in system 200 as described with reference to FIG. 2. Frying can be done, for example, for a period of 1 to 24 hours a day (e.g., 2-12 hours a day). In some embodiments, frying can be done for several consecutive days, such as one to four days, or a week.

Heating of the frying oil can occur continuously or have one or more breaks during the frying period. The breaks can allow the frying oil to cool below the frying temperature for a rest period. The fryer can subsequently be re-heated to the frying temperature for another batch of frying. The frying oil can then be maintained at the frying temperature. The total frying period can include these break and rest periods.

Uniformly heating the frying oil can include using an electric or gas heating element. Uniformly heating the frying oil can include using a frying system where the heating element is surrounded by a jacket to transfer heat from the heating element to the frying oil. The jacket can fully or partially cover the heating element. In these cases, the frying oil can, for example, entirely cover the jacket or partially cover the jacket.

Alternatively, uniformly heating the frying oil can include using a resistor to regulate the heat produced by the heating element, or to distribute the heat from the heating element throughout the frying pot. In this case, the resistor can, for example, be placed in series with the heating element to regulating heating in the fryer.

In another embodiment, uniform heating of the frying oil can be done with a heating element having a large surface area. With a larger surface area, the heating element could be, for example, heated to a lower overall temperature in order to maintain the frying oil at an appropriate frying temperature.

Uniform heating of the frying oil with jacket 202 can prevent hot and cold spots from forming within the frying oil in frying pot 206. Additionally, the lack of oil hot spots near heating element 204 can reduce polymer formation near heating element 204. This in turn can reduce the formation of foam in the frying oil.

Frying Oil

The methods, systems, and apparatuses described herein use a frying oil. The frying oil can be, for example, a conventional frying oil such as peanut oil, soybean oil, canola oil, corn oil, cottonseed oil, coconut oil, lard, grapeseed oil, or a combination thereof. When the frying oil is used for frying for a designated frying period in a system such as system 200 with uniform heat distribution, the frying oil can have more uniform frying temperature, less foaming and less polymer formation, slower oxidation, and a less opaque appearance.

Generally, the average temperature throughout the frying oil during the frying period can be about 170° C. to about 210° C., or preferably 180° C. to about 190° C. The frying oil can be heated, for example, so that no part of the oil exceeds 220° C. In some embodiments, the frying oil can be heated, for example, so that no part of the oil exceeds 210° C. In further embodiments, the frying oil can be heated, for example, so that no part of the oil exceeds 200° C. In further embodiments, the frying oil can be heated, for example, so that no part of the oil exceeds 190° C.

The frying period can be, for example, one to seven days (e.g., four days, three days, or two days). Multiple batches of food can be fried during these periods, including foods of different shape and size, and requiring different frying times.

Oil used for frying can undergo a series of different reactions induced by the heat at which it is used, including polymerization, decomposition, and thermoxidation that cause problems such as foaming. These reactions form degradation compounds, such as polymerized triacylglycerols (TAG) or "polymers", oxidized TAG (oxTAG), diacylglycerols (DAG), monoacylglycerols (MAG), free fatty acids (FFA) and shorter chain (<C10) volatile and non-volatile compounds. Oil degradation rates depend upon unsaturation and saturation compositions of the oil or TAG, frying temperature, initial fresh oil quality, food being fried, dissolved oxygen, and other variables.

The lifetime of a fry oil can be determined typically by Total Polar Materials (TPM), of which polymers, oxTAG, DAG, MAG and FFA are part of, free fatty acid (FFA) content, and, red color, depending upon relevant regulations. The more an oil degrades, the faster it reaches its lifetime. Additionally, foaming can occur as the oil degrades and can cause safety and food quality issues. Reduction of amount or rate of degradation compound formation can minimize foaming, improving safety and food quality.

With a uniformly heated frying oil, some of these reactions can be minimized with the prevention of "hot spot" formation. For example, at the end of the frying period, the frying oil can be substantially free of foam, and substantially free of foam forming polymers.

Specifically, polymerization of TAG can occur where unsaturated TAG molecules are polymerized through free radical reactions. Polymerization in the frying oil can be reduced compared to conventional fryers because of the lack of "hot spots" near the heating element. Specifically, less polymerization of triacylglycerols occurs without the catalyst of high heat. Overall polymer concentration of the frying oil can be measured, for example, by chromatography. The frying oil can contain, for example, less than 10 area % of polymers at the end of the frying period compared to high pressure size exclusion chromatography (HPSEC) peaks representing the frying oil. In some embodiments, the frying oil can contain, for example, less than 5 area % of polymers at the end of the frying period. In other embodiments, the frying oil can contain, for example, less than 2 area % or less than 1 area % of polymers at the end of the frying period.

The reduction of polymer concentration can help prevent polymer build-up in the oil, such as polymer layers on the surface of the frying oil, in addition to on the sides of the frying pot. Moreover, the reduction of polymer formation can reduce foaming of the frying oil even in frying oils including no anti-foaming agent or less anti-foaming agent than is conventionally used.

Thermoxidation can also occur in frying oils as induced by high temperatures. Additionally, the rate of oxidation of the frying oil can correlate with the frying oil's lifespan. Polymer concentration can, for example, indicate oxidation of the frying oil. In various embodiments, the lower concentration of oxidation products can, for example, reduce foaming in the frying oil.

Frying oils can contain free fatty acids of different lengths, some of which may polymerize. Triacylglycerols can form polymers when exposed to high temperatures. Once the frying period is finished, about 0.40 area % to about 0.60 area % (e.g., about 0.42 area % to about 0.52 area %) of the frying oil can be free fatty acids; about 0.10 area % to about 0.20 area % (e.g., about 0.12 area % to about 0.18 area %) of the frying oil can be monoacylglycerols; about 0.90 area % to about 1.40 area % (e.g., about 0.85 area % to about 1.30 area %) of the frying oil can be diacylglycerols; and about 92 area % to about 97 area % of the frying acid can be triacylglycerols. The high amount of triacylglycerols can, for example, in some oils indicate less polymerization.

The frying oil can be analyzed with regard to polymer and free fatty acid content via, for example, high performance size exclusion chromatography (HPSEC). The area % measurements of polymers, TAG, DAG, MAG and FFA can be measured as a relative area of the peak in HPSEC compared to the entire frying oil sample. These area % measurements assume 100% elution of the frying oil sample from the chromatographic column. Neither internal standard nor component standards are used for these measurements because the polymers are a complex mixture of components, and HPSEC separates based on molecular size and shape, not individual species, so standards are not necessarily available.

The frying oil can also change color and opaqueness as it is used for frying. Color of the frying oil can, for example, be studied with the CIELAB (CIE L*a*b) color space. The CIELAB color space expresses color in three numerical values that represent xyz coordinates on the CIELAB color space: L* for lightness, and a* and b* for green-red and blue-yellow color components, respectively. Once the frying period is finished, the frying oil can have, for example, a light measurement (L*) of about 4.10 to about 0.70, a red-green (a*) measurement of about −4.10 to about 0.70, and a blue-yellow (b*) measurement of about 13.00 to about 60.00.

The opaqueness of the frying oil can also be studied by measuring haze. Haze can be transmission haze (which occurs when light passes through material) or reflection haze (which occurs when light is reflected off the surface of the material). In various embodiments, at the end of the frying period, the frying oil can have, for example, a transmission haze of about 3.60 to about 17.00. The change of color and opaqueness over time can be more rapid compared to a conventional fryer. Light and haze measurements can be obtained, for example, by using a HunterColor Colorimeter, such as Model Vista by HunterLab®, with a 10 mm cuvette.

Decomposition can also occur within frying oils as they are heated. As frying oil is used, it can produce degradation products, such as aldehydes. The aldehydes can include pentanal, octanal, hexanal, 1,5-octadien-3-ol, heptanal, or a combination thereof. In various embodiments of the present invention, the rate of production of these degradation products can be significantly slower than in a conventional fryer. The degradation products can form at a rate of about 2.0 to about 5.0 slower compared to a conventional fryer. For example, pentanal can form at a rate of about 5.0 to 6.0 times slower, octanal can form at a rate of about 2.0 to 3.0 times slower, hexanal can form at a rate of about 2.0 to 3.0 times slower, 1,5-octadien-3-ol can form at a rate of about 2.0 to 3.0 times slower, and heptanal can form at a rate of about 2.0 to 3.0 times slower.

Overall, the use of uniform heat distribution, avoidance of heating oil above 220 degrees Celsius, or use of a jacket in a fryer system can decrease polymerization, decomposition, and oxidation of the frying oil. In contrast, the change of color and opaqueness can occur at a more rapid pace when heating is distributed uniformly.

EXAMPLES

Various embodiments of the present disclosure can be better understood by reference to the following Examples which are offered by way of illustration. The present disclosure is not limited to the Examples given herein.

Examples 1—Frying Oil with Conventional Heating Element

Example 1 included testing of frying systems with a traditional heating element not covered by a jacket. In Example 1, 2.0 kg of DMPS (dimethylpolysiloxane, antifoaming agent)-free soybean oil (US Foods, Rosemont, IL), were placed into a conventional frying pot. The frying pot was inserted into a conventional fryer (Waring® 2Qt Deep Fryer, Conair Corp., Stamford, CT) heated to about 180° C. No food was fried in Example 1.

The temperature and polymer concentration were monitored at the top and the bottom of the fryer for approximately 7 hours over 4 consecutive days. Each morning, a sample of about 1 g was collected from the fryer prior to frying. Two additional samples were collected at the end of each day (of about 1 g) at the top and the bottom of the fryer. The samples were analyzed for polymer concentration.

High performance size exclusion chromatography was used to determine polymer content. Specifically, polymerized triacylglycerol (PTAG) concentration in the frying oil was detected. The chromatography method relied on separation of the molecules based on molecular size (shape and molecular weight) of the molecules. Size exclusion columns were used for separation coupled to an Evaporative Light Scattering Detector (ELSD) or Refractive Index Detection (RI).

For measurements of polymers in Examples 1-2, 4-5, and 7-8, Waters High Performance Liquid Chromatography (HPLC) 2695 was used. The mobile phase and retention time standard were prepared as known to one in the art. The samples of frying oil were prepared by melting (if not in the liquid state), and 20 mg were added of the sample to a 20 mL scintillation vial. 10 mL of tetrahydrofuran (THF) was added to the sample via Class A Pipette. For RI detection, the sample size was 200 mg diluted in 10 mL THF. Sodium sulfate was added to the scintillation vial to bind moisture. The scintillation vial containing the sample was then mixed by vortex or shaking.

Subsequently, the scintillation vial containing the sample was filtered with a Teflon® filter (0.2-25 mm) into a 2 mL autosampler and capped with a Teflon® septum. The sample was then run through chromatographic separation in an Alltech® 3300 ELSD HP model for high performance size exclusion chromatography on two PLgel, 5 µm, 500 Å, 300×7.5 mm columns. Alternatively, LC separations could also be made using two Waters GPC columns in series at 40° C.: Styragel HR 1.0 (300 mm×7.8 mm, 5 µm particle size) and Stryragel HR 0.5 (300 mm×7.8 mm, 5 µm particle size). Size exclusion columns used for the separation were coupled to an Evaporative Light Scattering Detector (ELSD) or Refractive Index Detection (RI). The resulting polymer data was determined based on an area percent basis through area normalization of all peaks present in the chromatography results.

Polymer content, as determined by chromatography, in addition to temperatures of days 1-4 of Example 1 are summarized in Table 1.

TABLE 1

Polymer Measurements, Example 1.

| Example | Description | Polymers (area %) | Temperature (° C.) |
|---|---|---|---|
| Example 1 - Day 1 | Control | 0.22% | N/A |
|  | Top of Fryer | 1.39% | 170.67 |
|  | Bottom of Fryer | 1.45% | 176.94 |
| Example 1 - Day 2 | Control | 1.42% | N/A |
|  | Top of Fryer | 2.50% | 174.04 |
|  | Bottom of Fryer | 2.37% | 181.07 |
| Example 1 - Day 3 | Control | 2.39% | N/A |
|  | Top of Fryer | 3.38% | 174.20 |
|  | Bottom of Fryer | 3.28% | 179.59 |
| Example 1 - Day 4 | Control | 3.61% | N/A |
|  | Top of Fryer | 4.56% | 175.84 |
|  | Bottom of Fryer | 4.50% | 181.31 |

The temperatures shown are the average temperatures throughout the frying period. The temperatures monitored in the bottom of the fryer over the four consecutive days for Example 1 fluctuated between about 170° C. and about 213° C. The average temperatures do not reflect the large fluctuation over the course of the four days of Example 1. Additionally, Example 1 showed noticeable differences in temperature from the top of the fryer to the bottom of the fryer at the end of the day.

Example 2—Frying Oil with Jacketed Heating Element

Example 2 included testing of frying systems with a heating element covered by a jacket. In Example 2, 2.0 kg of DMPS-free soybean oil (US Foods, Rosemont, IL), were placed into a frying pot. The frying pot was inserted into a fryer having a jacketed heating element and heated to about 180° C. No food was fried in Example 2.

The temperature and polymer concentration were monitored at the top and the bottom of the fryer for approximately 7 hours over 4 consecutive days. Each morning, a sample was collected from the fryer of about 1 g prior to frying. Two additional samples were collected at the end of each day (of about 1 g) at the top and the bottom of the fryer. The samples were analyzed for polymer concentration by chromatography as described in reference to Example 1. Days 1-4 of Example 2 are summarized in Table 2.

TABLE 2

Polymer Measurements, Example 2.

| Example | Description | Polymers (area %) | Temperature (° C.) |
|---|---|---|---|
| Example 2 - Day 1 | Control | 0.24% | N/A |
|  | Top of Fryer | 0.93% | 171.06 |
|  | Bottom of Fryer | 0.93% | 174.52 |
| Example 2 - Day 2 | Control | 1.42% | N/A |
|  | Top of Fryer | 2.06% | 171.20 |
|  | Bottom of Fryer | 2.01% | 175.34 |
| Example 2 - Day 3 | Control | 2.06% | N/A |
|  | Top of Fryer | 3.07% | 172.39 |
|  | Bottom of Fryer | 3.04% | 176.94 |

TABLE 2-continued

Polymer Measurements, Example 2.

| Example | Description | Polymers (area %) | Temperature (° C.) |
|---|---|---|---|
| Example 2 - Day 4 | Control | 3.13% | N/A |
|  | Top of Fryer | 4.09% | 170.90 |
|  | Bottom of Fryer | 4.16% | 175.83 |

The temperatures shown are the average temperatures throughout the frying period. The temperatures monitored in the top and the bottom of the fryer over the four consecutive days for Example 2 remained relatively steady. There was overall less fluctuation in temperature in Example 2 (the jacketed fryer) compared to Example 1 (the conventional fryer).

Example 3—Analysis of Examples 1 and 2

The comparison of a fryer with a conventional naked heating element (Example 1) and a fryer with a jacket (Example 2) is shown in Table 3.

TABLE 3

Comparative Polymer concentration, Examples 1 and 2.

|  | Example 1. Conventional Area % Polymers | Example 2. Jacketed Area % Polymers | Difference in Polymer Concentration |
|---|---|---|---|
| Day 0 | 0.22% | 0.24% | 0.00 |
| Day 1 | 1.42% | 0.93% | 52% |
| Day 2 | 2.44% | 2.03% | 20% |
| Day 3 | 3.33% | 3.03% | 10% |
| Day 4 | 4.53% | 4.12% | 10% |

The polymer formation in the jacketed fryer (Example 2) was about 10% lower than that in the conventional fryer (Example 1). With the conventional fryer in Example 1, the oil near the heating element (near the bottom of the oil pot) was significantly higher in temperature as compared to the oil in the rest of the pot (see, e.g., Table 1). However, the quantity of oil at this elevated temperature was small compared to the pot as a whole; oil at the top of the pots did not reach the same temperatures. This created hot and cold spots within the frying oil.

In comparison, the frying oil in the jacketed fryer in Example 2 remained more consistent in temperature throughout the fryer. The top and bottom of the frying oil in the jacketed fryer were more similarly heated, resulting in fewer hot and cold spots. The difference in heat dissipation resulted in lower polymer formation over time during the four days of consecutive frying, both at the bottom and at the top of the frying pot.

Example 4—Frying Potatoes with Conventional Heating Element

In Example 4, a conventional heating element was used to fry potatoes. 2.0 kg of DMPS-free soybean oil (US Foods, Rosemont, IL), were placed into a frying pot. The frying pot was inserted into a conventional fryer (Waring® 2Qt Deep Fryer, Conair Corp., Stamford, CT) having a conventional heating element and heated to about 180° C. The conventional fryer was run for about 7 hours a day, for four consecutive days. The french fries were added in 70 g batches and fried for 5 minutes per batch. Each day of Example 4, five batches of french fries were fried throughout the day.

TABLE 4

Weight Percent of Components, Example 4.

| Example | Polymers | TAG | DAG | MAG | FFA |
|---|---|---|---|---|---|
| Control | 0.19% | 98.18% | 0.99% | 0.17% | 0.47% |
| Example 4 - Day 1 | 3.71% | 94.66% | 1.03% | 0.14% | 0.46% |
| Example 4 - Day 2 | 8.51% | 89.74% | 1.14% | 0.13% | 0.48% |
| Example 4 - Day 3 | 13.39% | 84.85% | 1.25% | 0.09% | 0.42% |
| Example 4 - Day 4 | 16.11% | 82.13% | 1.24% | 0.08% | 0.44% |

Table 3 shows polymers measured on average across each of the four consecutive days. Additionally, Table 3 shows triacylglycerols (TAG), diacylglycerols (DAG), monoacylglycerols (MAG), and free fatty acids (FFA) content measured in the frying oil by weight percent. Polymers, TAG, DAG, MAG, and FFA were measured by chromatography as described in reference to Example 1.

Examples 5—Frying Potatoes with Jacketed Heating Element

In Example 5, a jacketed heating element was used to fry potatoes. 2.0 kg of DMPS free soybean oil (US Foods, Rosemont, IL), were placed into a frying pot. The frying pot was inserted into a fryer having a jacketed heating element and heated to about 180° C. The fryer was run for about 7 hours a day, for four consecutive days. The french fries were added in 70 g batches and fried for 5 minutes per batch. Each day of Example 5, five batches of french fries were fried throughout the day.

TABLE 5

Weight Percent of Components, Example 5

| Example | Polymers | TAG | DAG | MAG | FFA |
|---|---|---|---|---|---|
| Example 5 - Day 1 | 1.62% | 96.56% | 1.21% | 0.16% | 0.46% |
| Example 5 - Day 2 | 2.05% | 96.32% | 1.00% | 0.17% | 0.46% |
| Example 5 - Day 3 | 5.06% | 93.34% | 0.96% | 0.15% | 0.49% |
| Example 5 - Day 4 | 6.13% | 92.01% | 1.28% | 0.13% | 0.45% |

Table 4 shows polymers measured on average on each of the four consecutive days. Additionally, Table 4 shows triacylglycerols (TAG), diacylglycerols (DAG), monoacylglycerols (MAG), and free fatty acids (FFA) content measured in the frying oil by weight percent. Polymers, TAG, DAG, MAG, and FFA were measured by chromatography as described in reference to Example 1.

Example 6—Analysis of Examples 4 and 5

Examples 4 and 5 were compared side by side. The conventional fryer (Example 4) showed a 2.5 times higher oxidation rate compared to the jacketed fryer (Example 5), based on the measured polymer formation. The temperature of each Example was measured every minute throughout the testing. The temperature difference in the conventional fryer versus the jacketed fryer is shown in Table 5:

TABLE 6

Average Fryer Temperature, Examples 4 and 5

| | Example 4 Conventional Fryer Temperature (° C.) | Example 5 Jacketed Fryer Temperature (° C.) | Difference in Temperature (° C.) |
|---|---|---|---|
| Day 1 | 180.9 | 186.12 | 5.22 |
| Day 2 | 181.9 | 181.03 | 0.87 |
| Day 3 | 182.16 | 181.47 | 0.69 |
| Day 4 | Could Not Be Completed | 182.86 | N/A |

Temperature data for Examples 4 and 5 was obtained with a probe placed in the middle of the frying vat containing frying oil. The temperature data for Day 4 of Example 4 (the conventional fryer) could not be measured due to excessive foaming. In contrast, the jacketed heater was both measurable and had not significantly fluctuated in temperature from day 3 to day 4.

Figure 4:
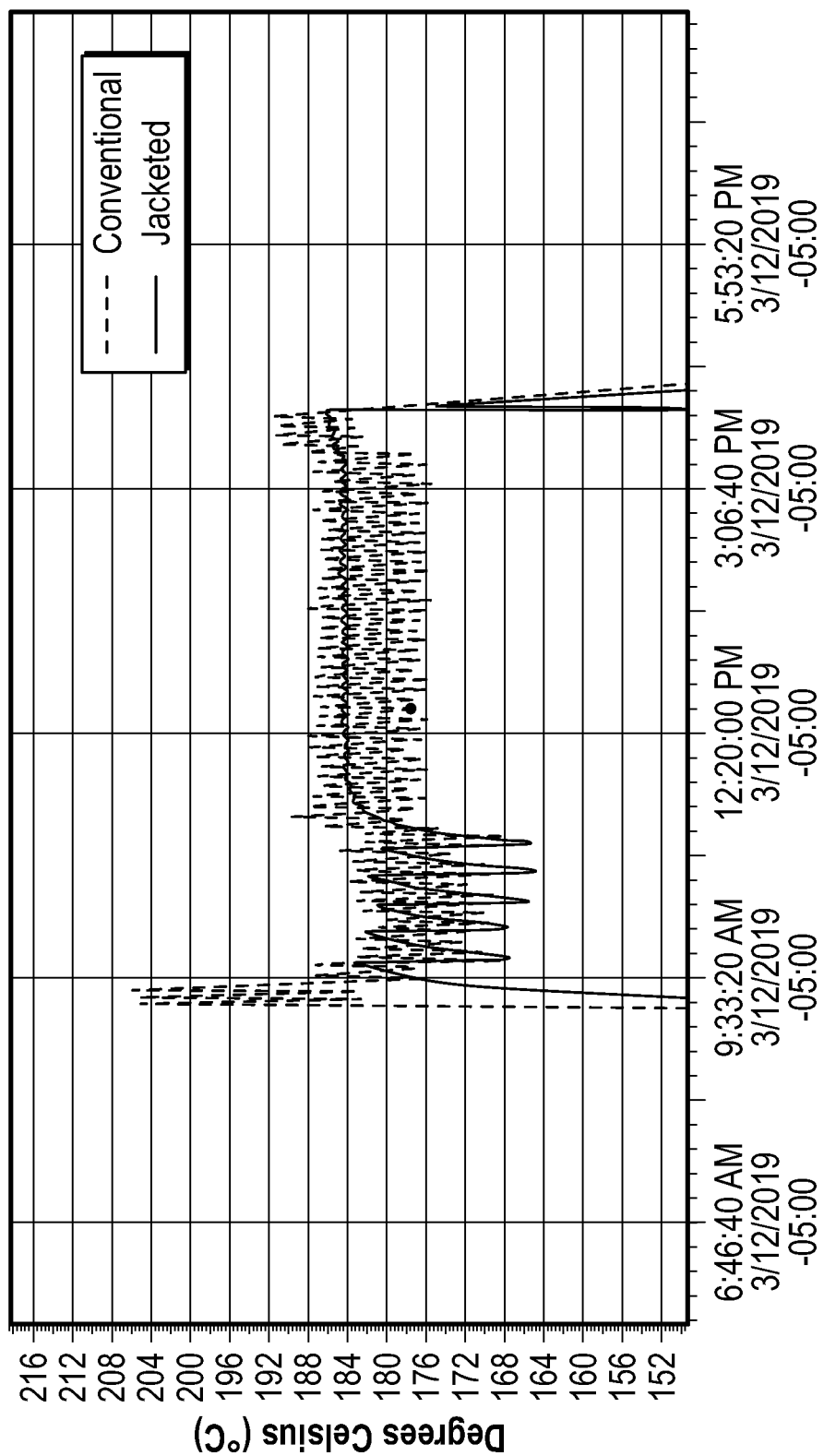
FIGS. 4-7 are charts depicting the temperature recording in a jacketed fryer compared to a conventional fryer, according to various embodiments.
Figure 5:
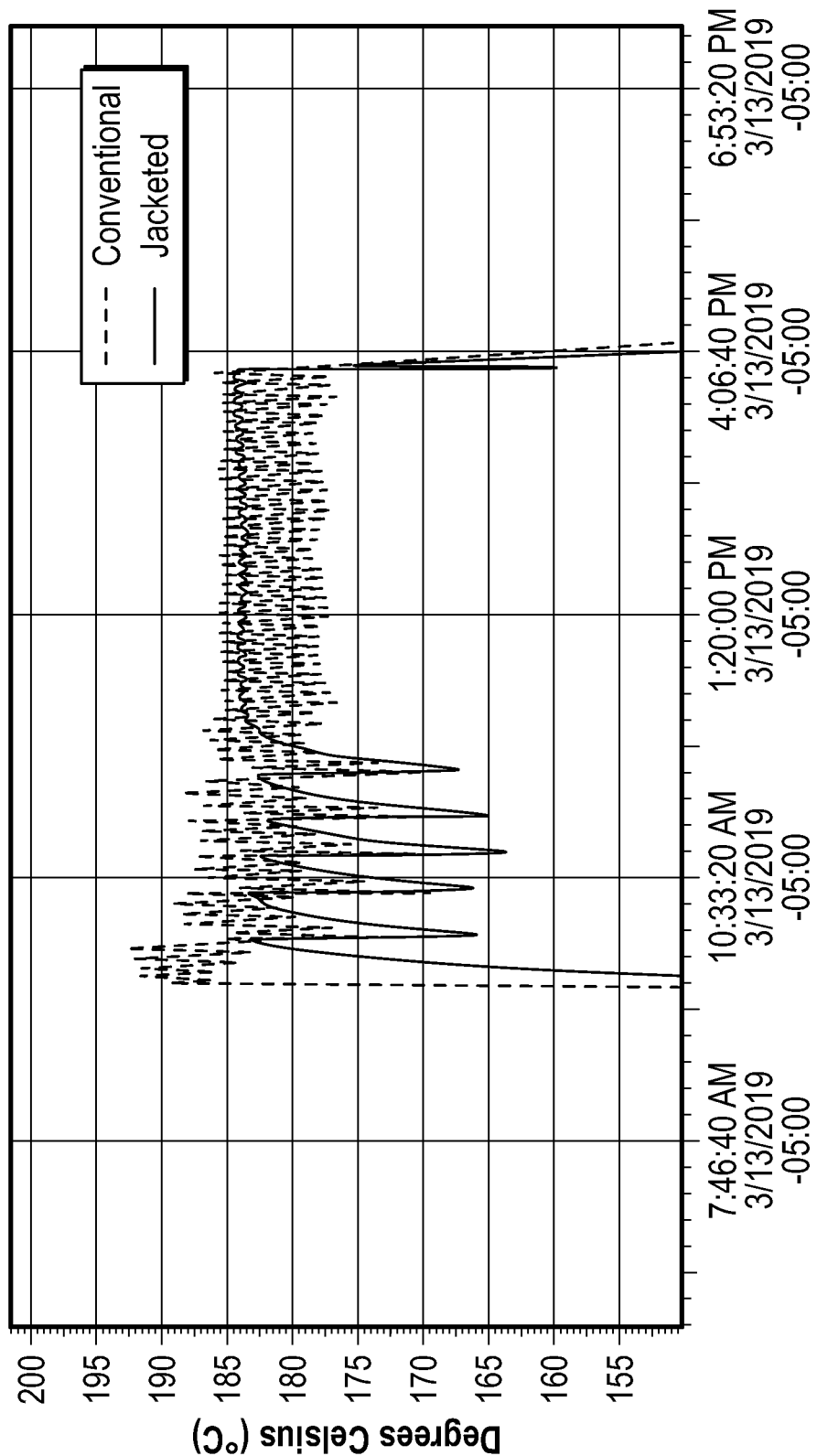
Figure 6:
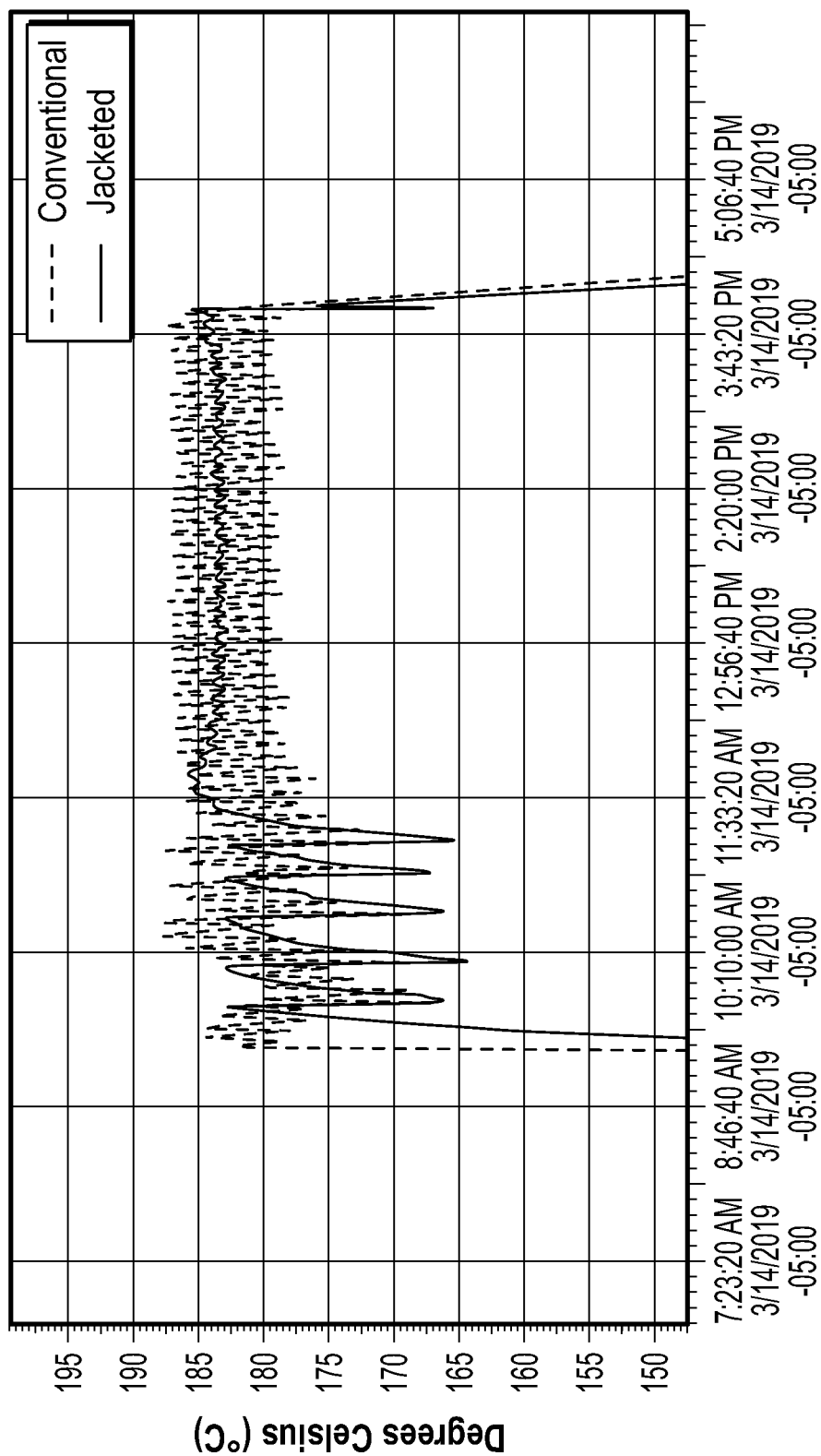
Figure 7:
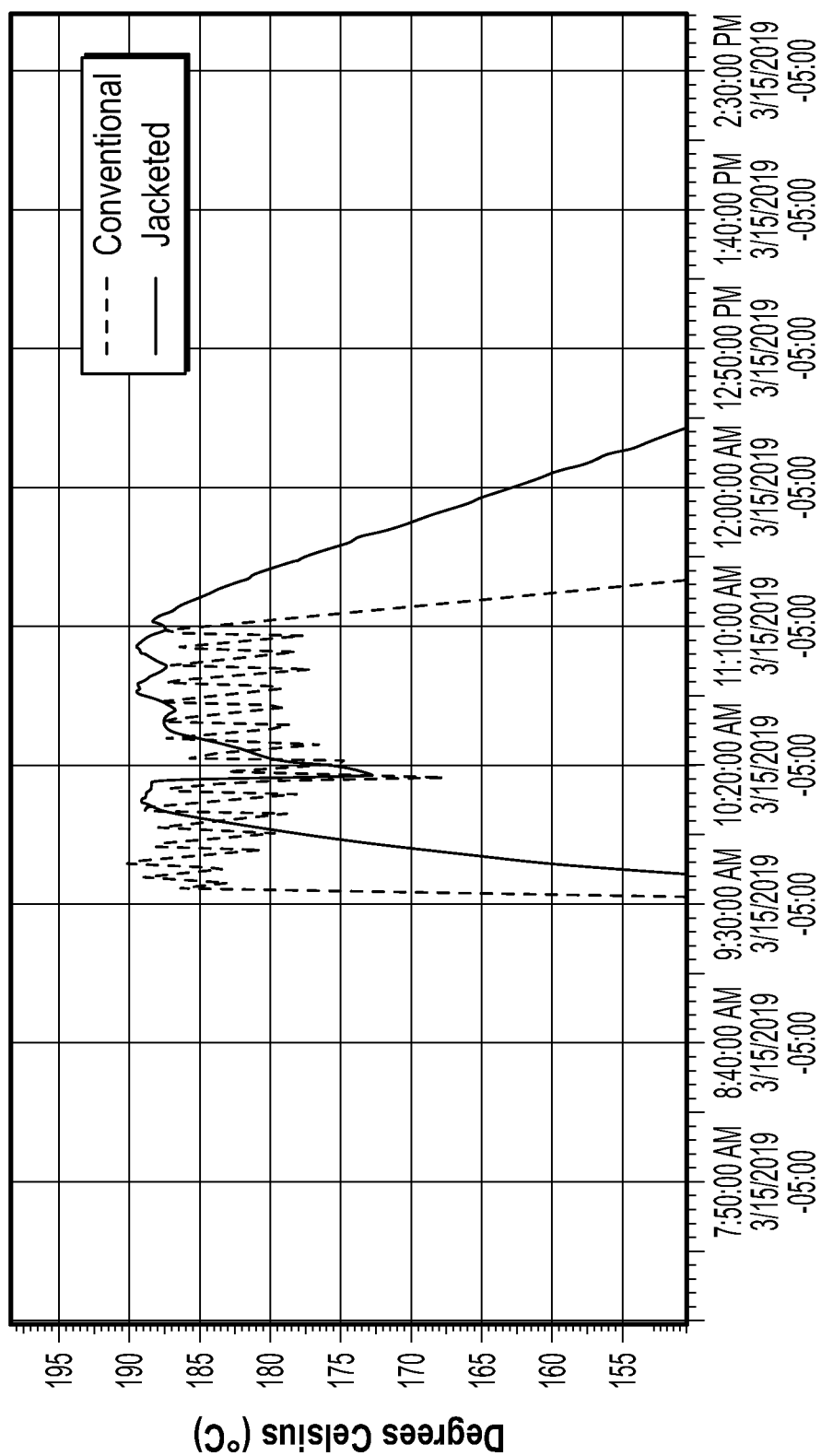

The temperature of both the conventional fryer (Example 4) and the jacketed fryer (Example 5) was graphed compared to time for each of days 1 to 4. FIG. 4 shows the temperatures of both Examples 4 and 5 on day one over time. FIG. 5 shows the temperatures of both Examples 4 and 5 on day two over time. FIG. 6 shows the temperatures of both Examples 4 and 5 on day three over time. FIG. 7 shows the temperatures of both Examples 4 and 5 on day four over time. These graphs are representative of the temperature data for all Example temperature data.

The Examples were also tested for lightness and color. Table 6 below summarizes the overall light (L), red (a*) blue (b*), and haze measurements for fryer oil for Example 4 and 5.

TABLE 7

Light Measurements, Examples 4 and 5

| | L | a* | b* | haze |
|---|---|---|---|---|
| Example 4 - Day 1 | 98.55 | −4.81 | 26.14 | 1.88 |
| Example 4 - Day 2 | 94.52 | −4.29 | 45.63 | 6.33 |
| Example 4 - Day 3 | 86.91 | 0.88 | 64.29 | 10.93 |
| Example 4 - Day 4 | 81.61 | 7.83 | 78.64 | 26.21 |
| Example 5 - Day 1 | 97.40 | −3.51 | 20.88 | 4.95 |
| Example 5 - Day 2 | 95.57 | −3.73 | 33.09 | 5.73 |
| Example 5 - Day 3 | 92.64 | −2.30 | 47.44 | 8.04 |
| Example 5 - Day 4 | 88.85 | 0.62 | 57.85 | 16.33 |

Light and haze measurements were taken on a Hunter® calorimeter with a 14 mm cuvette. The change color of the fryer oil in the jacketed fryer (Example 5) was less rapid compared to a conventional fryer (Example 4).

Example 7—Frying Potatoes with Conventional Heating Element

In Example 7, a conventional heating element was used to fry potatoes. 2.0 kg of DMPS-free soybean oil (US Foods, Rosemont, IL), were placed into a frying pot. The frying pot was inserted into a conventional fryer (Waring@ 2Qt Deep Fryer, Conair Corp., Stamford, CT) having a conventional heating element and heated to about 180° C. The conventional fryer was run for about 7 hours a day, for four consecutive days. The french fries were added in 70 g batches and fried for 5 minutes per batch Each day of Example 7, five batches of french fries were fried throughout the day.

TABLE 8

Weight Percent of Components, Example 7

|  | Polymers | TAG | DAG | MAG | FFA |
|---|---|---|---|---|---|
| Control | 0.19% | 98.37% | 0.84% | 0.15% | 0.45% |
| Day 1 | 7.12% | 91.47% | 0.79% | 0.15% | 0.47% |
| Day 2 | 13.25% | 84.96% | 1.24% | 0.10% | 0.45% |
| Day 3 | 18.20% | 80.01% | 1.29% | 0.08% | 0.42% |
| Day 4 | 19.63% | 78.51% | 1.34% | 0.11% | 0.42% |

Table 7 shows polymers measured on average on each of the four consecutive days. Additionally, Table 7 shows triacylglycerols (TAG), diacylglycerols (DAG), monoacylglycerols (MAG), and free fatty acids (FFA) content measured in the frying oil by weight percent. Polymers, TAG, DAG, MAG, and FFA were measured by chromatography as described in reference to Example 1.

Example 8—Frying Potatoes with Jacketed Heating Element

In Example 8, a jacketed heating element was used to fry potatoes. 2.0 kg of DMPS free soybean oil (US Foods, Rosemont, IL), were placed into a frying pot. The frying pot was inserted into a fryer having a jacketed heating element and heated to about 180° C. The fryer was run for about 7 hours a day, for four consecutive days. The french fries were added in 70 g batches and fried for 5 minutes per batch. Each day of Example 8, five batches of french fries were fried throughout the day.

TABLE 9

Weight Percent of Components, Example 8

|  | Polymers | TAG | DAG | MAG | FFA |
|---|---|---|---|---|---|
| Day 1 | 1.66 | 96.83 | 0.89 | 0.16 | 0.46 |
| Day 2 | 3.12 | 95.47 | 0.85 | 0.13 | 0.43 |
| Day 3 | 4.54 | 93.79 | 1.00 | 0.15 | 0.51 |
| Day 4 | 5.08 | 93.26 | 1.07 | 0.14 | 0.46 |

Table 8 shows polymers measured on average on each of the four consecutive days. Additionally, Table 8 shows triacylglycerols (TAG), diacylglycerols (DAG), monoacylglycerols (MAG), and free fatty acids (FFA) content measured in the frying oil by weight percent. Polymers, TAG, DAG, MAG, and FFA were measured by chromatography as described in reference to Example 1.

Example 9—Analysis of Examples 7 and 8

Examples 7 and 8 were compared side-by-side. The Examples were tested for lightness and color. Table 9 below summarizes the overall light (L), red (a*) blue (b*), and haze measurements for fryer oil for Examples 7 and 8.

TABLE 10

Light Measurements, Example 7 and 8.

|  | L | a* | b* | haze |
|---|---|---|---|---|
| Example 7 - Day 1 | 97.97 | −5.48 | 31.92 | 2.85 |
| Example 7 - Day 2 | 91.66 | −1.49 | 62.18 | 5.38 |
| Example 7 - Day 3 | 82.14 | 10.3 | 86.55 | 14.15 |
| Example 7 - Day 4 | 78.87 | 14.32 | 91.46 | 18.65 |

TABLE 10-continued

Light Measurements, Example 7 and 8.

|  | L | a* | b* | haze |
|---|---|---|---|---|
| Example 8 - Day 1 | 100.14 | −3.18 | 13.65 | 3.67 |
| Example 8 - Day 2 | 97.53 | −4.01 | 26.47 | 6.23 |
| Example 8 - Day 3 | 95.18 | −3.63 | 38.84 | 8.19 |
| Example 8 - Day 4 | 94.38 | −3.33 | 42.34 | 7.11 |

Light and haze measurements were taken on a Hunter® calorimeter with a 14 mm cuvette. The color changes in the conventional fryer (Example 7) was more rapid compared to the jacketed fryer (Example 8).

Examples 7 and 8 were also tested for other degradation products including aldehydes. The top five compounds by abundance for both the conventional fryer and the jacketed fryer were pentanal, hexanal, (E,E)-2,4-heptadienal, (E,E)-2,4-decadienal, and (E)-2-heptenal. The top five compounds that differed in abundance between the jacketed fryer and the conventional fryer were pentanal, octanal, hexanal, 1,5-octadien-3-ol, and heptanal. The rate of formation of these products is shown in Table 10:

TABLE 11

Rate of Formation of Degradation Products, Examples 7 and 8.

| Product | Example 7 - Day 4 Conventional Fryer Relative Concentration | Example 8 - Day 4 Jacketed Fryer Relative Concentration | Rate of Formation Conventional vs. Jacketed |
|---|---|---|---|
| Pentanal | 7.04 | 1.29 | 5.49X |
| Octanal | 0.13 | 0.06 | 2.78X |
| Hexanal | 6.32 | 2.55 | 2.48X |
| 1,5-octadien-3-ol | 0.03 | 0.01 | 2.43X |
| (e)-2-heptenal | 2.34 | 1.61 | 2.37X |

Degradation products were measured by dynamic headspace sampling of the frying oil. Samples of 0.5 g of the frying oil were weighed into 20 mL vials. Using a Gerstel MultiPurpose Sampler (MPS) (Gerstel, Linthicum, MD), the sample vials were transferred to the dynamic headspace incubator (DHS) (Gerstel, Linthicum, MD), and exposed to ten minutes of equilibration (shaking at 1,000 rpm) at 60° C. The sample vials were purged with helium gas at a flow of 75 mL/min for a total flow of 0.75 liters of gas flowing over the sample and through the TDU trap (10 min). The samples were extracted at 60° C., followed by desorption and trapping of volatiles in the cryo-cooled inlet of the system. The extracted volatiles were separated and analyzed with a LECO Pegasus 4d 2-Dimensional Gas Chromatograph-Time of Flight Mass Spectrometer (LECO Corporation, St. Joseph, MI). The relative concentration of each component was calculated by taking the ratio of analyte peak area divided by internal standard peak area.

Overall, aldehyde formation in the conventional fryer (Example 7) was 2.37 to 5.49 times more rapid than in the jacketed fryer (Example 8). Additionally, the rate of oxidation in the jacketed fryer (Example 8) was significantly less than in the conventional fryer (Example 7). This allows frying oil to last longer.

Additional Embodiments

The following exemplary embodiments are provided, the numbering of which is not to be construed as designating levels of importance:

Embodiment 1 includes a method of frying, including heating frying oil to a frying temperature and maintaining the frying oil at the frying temperature for a frying period, wherein during the method no part of the oil exceeds 220° C.

Embodiment 2 includes the method of Embodiment 1, wherein the frying oil is substantially free of foam at the end of the frying period.

Embodiment 3 includes the method of any of Embodiments 1-2, wherein the frying oil is substantially free of polymers that cause foaming of the frying oil at the end of the frying period.

Embodiment 4 includes the method of any of Embodiments 1-3, wherein the method further includes one or more breaks in the frying period, wherein the one or more breaks allow the frying oil to cool to below the frying temperature for a rest period, heating the frying oil back to the frying temperature and maintaining the frying oil at the frying temperature for a remainder of the frying period.

Embodiment 5 includes the method of any of Embodiments 1-4, wherein the frying period is one day.

Embodiment 6 includes the method of any of Embodiments 1-5, wherein the frying period is two days.

Embodiment 7 includes the method of any of Embodiments 1-6, wherein the frying period is three days.

Embodiment 8 includes the method of any of Embodiments 1-7, wherein the frying period is four days.

Embodiment 9 includes the method of any of Embodiments 1-8, wherein the frying period is one week.

Embodiment 10 includes the method of any of Embodiments 1-9, wherein an area % of an HPSEC elution peak or peaks corresponding to the polymers is less than 10% relative to the total area of peaks eluted from the frying oil.

Embodiment 11 includes the method of any of Embodiments 1-10, wherein an area % of an HPSEC elution peak or peaks corresponding to the polymers is less than 5% relative to the total area of peaks eluted from the frying oil.

Embodiment 12 includes the method of any of Embodiments 1-11, wherein heating and maintaining the frying oil at the frying temperature includes using a heating element surrounded by a jacket to heat the oil.

Embodiment 13 includes the method of any of Embodiments 1-12, wherein the jacket prevents direct contact between the frying oil and the heating element.

Embodiment 14 includes the method of any of Embodiments 1-13, wherein the frying oil fills the frying pot above the jacket.

Embodiment 15 includes the method of any of Embodiments 1-14 wherein the frying oil fills the frying pot partially up the jacket.

Embodiment 16 includes the method of any of Embodiments 1-15 wherein heating and maintaining the frying oil includes heating the frying oil such that no part of the frying oil exceeds 210° C.

Embodiment 17 includes the method of any of Embodiments 1-16, wherein heating and maintaining the frying oil includes heating the frying oil such that no part of the frying oil exceeds 200° C.

Embodiment 18 includes the method of any of Embodiments 1-17, wherein heating and maintaining the frying oil includes heating the frying oil such that no part of the frying oil exceeds 195° C.

Embodiment 19 includes the method of any of Embodiments 1-18, wherein the frying temperature is about 170° C. to about 200° C.

Embodiment 20 includes the method of any of Embodiments 1-19, wherein the frying temperature is about 180° C. to about 190° C.

Embodiment 21 includes the method of any of Embodiments 1-20, wherein heating the frying oil includes heating with a heating element further includes a resistor.

Embodiment 22 includes the method of any of Embodiments 1-21, wherein the method includes frying food in the frying oil during the frying period.

Embodiment 23 includes the method of any of Embodiments 1-22, wherein the method includes frying one or more batches of food.

Embodiment 24 includes the method of any of Embodiments 1-23, wherein the ratio of frying oil to food is from about 4:1 to about 8:1.

Embodiment 25 includes the method of any of Embodiments 1-24, wherein the ratio of frying oil to food is from about 5:1 to about 7:1

Embodiment 26 includes the method of any of Embodiments 1-25, wherein frying is done for about 1 hour to about 24 hours a day.

Embodiment 27 includes a method of frying including heating frying oil with a heating element surrounded by a jacket preventing direct contact between the frying oil and the heating element, wherein the jacket transfers heat from the heating element to the frying oil.

Embodiment 28 includes a system for frying including a pot for holding a frying oil, a heating element for heating the frying oil, and a jacket surrounding the heating element, the jacket preventing direct contact between the frying oil and the heating element, wherein the jacket is configured to uniformly distribute heat produced by the heating element within the pot such that the frying oil has less than 10 area % polymers, compared to an HPSEC elution peak or peaks, at the end of heating and maintaining the frying oil at a frying temperature for a frying period.

Embodiment 29 includes the system of Embodiment 28, wherein the heating element includes an electric heating element or a gas heating element.

Embodiment 30 includes the system of any of Embodiments 28-29, wherein the frying period includes one day.

Embodiment 31 includes the system of any of Embodiments 28-30, wherein the frying period includes four days.

Embodiment 32 includes the system of any of Embodiments 28-31, wherein the frying period includes a week.

Embodiment 33 includes the system of any of Embodiments 28-32, wherein the jacket is configured to distribute heat without creation of hot spots or cold spots.

Embodiment 34 includes the system of any of Embodiments 28-33, wherein the frying temperature is about 170° C. to about 215° C.

Embodiment 35 includes the system of any of Embodiments 28-34, wherein the frying temperature is about 180° C. to about 190° C.

Embodiment 36 includes the system of any of Embodiments 28-35, wherein no part of the frying oil exceeds 220° C. during heating and maintaining the frying oil.

Embodiment 37 includes the system of any of Embodiments 28-36, further includes a basket for holding food in the pot, the basket configured to allow held food to be submerged in the frying oil.

Embodiment 38 includes the system of any of Embodiments 28-37, wherein the ratio of frying oil to food in the fryer is about 5:1 to about 7:1.

Embodiment 39 includes the system of any of Embodiments 28-38, wherein the ratio of frying oil to food in the fryer is about 6:1.

Embodiment 40 includes the system of any of Embodiments 28-39, wherein heating and maintaining the frying oil at the frying temperature further includes: one or more breaks, the one or more breaks allowing the frying oil to cool to below the frying temperature for a rest period, subsequently heating the frying oil back to the frying temperature and maintaining the frying oil at the frying temperature for a remainder of the frying period.

Embodiment 41 includes the system of any of Embodiments 28-40, wherein an area % of an HPSEC elution peak or peaks corresponding to the polymers is less than 5% relative to the total area of peaks eluted from the frying oil.

Embodiment 42 includes the system of any of Embodiments 28-41, wherein an area % of an HPSEC elution peak or peaks corresponding to the polymers is less than 2% relative to the total area of peaks eluted from the frying oil.

Embodiment 43 includes the system of any of Embodiments 28-42, wherein an area % of an HPSEC elution peak or peaks corresponding to the polymers is less than 1% relative to the total area of peaks eluted from the frying oil.

Embodiment 44 includes the system of any of Embodiments 28-43, wherein the frying oil has a lightness (L*) of about 85.00 to about 102.00 at the end of the frying period.

Embodiment 45 includes the system of any of Embodiments 28-44, wherein the frying oil has a red-green (a*) of about-4.10 to about 0.70 at the end of the frying period.

Embodiment 46 includes the system of any of Embodiments 28-45, wherein the frying oil has a blue-yellow (b*) of about 13.00 to about 60.00 at the end of the frying period.

Embodiment 47 includes the system of any of Embodiments 28-46, wherein the frying oil has a haze of about 3.60 to about 17.00 at the end of the frying period.

Embodiment 48 includes the system of any of Embodiments 28-47, wherein at the end of the frying period, free fatty acids have a total area % of a high pressure size exclusion chromatography elution peak or peaks corresponding thereto of about 0.42 area % to about 0.52 area % relative to the total area of peaks eluted from the frying oil.

Embodiment 49 includes the system of any of Embodiments 28-48, wherein at the end of the frying period, monoacylglycerols have a total area % of a high pressure size exclusion chromatography elution peak or peaks corresponding thereto of about 0.12 area % to about 0.18 area % relative to the total area of peaks eluted from the frying oil.

Embodiment 50 includes the system of any of Embodiments 28-49, wherein at the end of the frying period, diacylglycerols have a total area % of a high pressure size exclusion chromatography elution peak or peaks corresponding thereto of about 0.85 area % to about 1.30 area % relative to the total area of peaks eluted from the frying oil.

Embodiment 51 includes the system of any of Embodiments 28-50, wherein at the end of the frying period, triacylglycerols have a total area % of a high pressure size exclusion chromatography elution peak or peaks corresponding thereto of about 92 area % to about 97 area % relative to the total area of peaks eluted from the frying oil.

Embodiment 52 includes the system of any of Embodiments 28-51, wherein the frying oil further includes one or more aldehydes at the end of the frying period.

Embodiment 53 includes the system of any of Embodiments 28-52, wherein at the end of the frying period the frying oil includes one or more aldehydes in a greater concentration than a frying oil heated and maintained at the frying temperature for the frying period using a heating element that directly contacts the frying oil.

Embodiment 54 includes the system of any of Embodiments 28-53, wherein at the end of the frying period the frying oil includes at least 2 times less of the aldehyde than a frying oil heated and maintained at the frying temperature for the frying period using a heating element that directly contacts the frying oil.

Embodiment 55 includes the system of any of Embodiments 28-54, wherein at the end of the frying period the frying oil includes at least 4 times less of the aldehyde than a frying oil heated and maintained at the frying temperature for the frying period using a heating element that directly contacts the frying oil.

Embodiment 56 includes the system of any of Embodiments 28-55, wherein the aldehydes are pentanal, octanal, hexanal, 1,5-octadien-3-al, heptanal, or combinations thereof.

Embodiment 57 includes an apparatus including a heating element, an oil tank, and a jacket surrounding the oil tank for transferring heat from the heating element to the oil tank, the jacket preventing direct contact between the heating element and contents of the oil tank.

Embodiment 58 includes the apparatus of Embodiment 57, wherein the jacket fully surrounds the oil tank.

Embodiment 59 includes the apparatus of and of Embodiments 57-58, wherein the jacket partially surrounds the oil tank.

Embodiment 60 includes the apparatus of and of Embodiments 57-59, wherein the jacket includes a heat transfer fluid that transfers heat from the heating element to the oil tank.

Embodiment 61 includes the apparatus of and of Embodiments 57-60, further includes a circulating pump that circulates the heat transfer fluid within the jacket to distribute heat therein.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

What is claimed is:

1. A method of frying, comprising:
heating frying oil to a frying temperature using a system for frying, the system comprising:
a frying pot containing the frying oil;
a jacket enclosing a heating element, heating media, a stirrer arranged to stir the heating media, and a vertical baffle separating the heating element from the stirrer, wherein the frying pot is at least partially immersed in the heating media; and
maintaining the frying oil at the frying temperature for a frying period;
wherein during the method no part of the frying oil exceeds 220° C.

2. The method of claim 1, wherein a surface of the frying oil is free of foam at the end of the frying period.

3. The method of claim 1, wherein the frying oil is free of polymers that cause foaming of the frying oil at the end of the frying period.

4. The method of claim 1, wherein the method comprises:
   one or more breaks between frying periods, wherein the one or more breaks allow the frying oil to cool to below the frying temperature for a rest period;
   heating the frying oil back to the frying temperature.

5. The method of claim 1, wherein the frying period is from one day to one week.

6. The method of claim 1, wherein, at the end of the frying period, the frying oil exhibits elution peaks having a total peak area when analyzed by high pressure size exclusion chromatography (HPSEC), and wherein 10 area % or less of the total peak area corresponds to polymers.

7. The method of claim 1 wherein heating and maintaining the frying oil comprises heating the frying oil such that no part of the frying oil exceeds 210° C.

8. The method of claim 1, wherein heating the frying oil comprises heating with a heating element further comprising a resistor.

9. The method of claim 1, wherein the method comprises frying food in the frying oil during the frying period.

10. The method of claim 9, wherein the ratio of frying oil to food is from about 4:1 to about 8:1.

11. The method of claim 1, wherein a total amount of frying periods is about 1 hour to about 24 hours in a day.

12. The method of claim 1, further comprising stirring the heating media with the stirrer.

13. The method of claim 1, wherein the frying oil is disposed within a frying pot, and wherein the frying pot is not in direct contact with the heating element.

14. The method of claim 1, wherein the frying oil is not in direct contact with the heating element.

15. A method of frying comprising:
   heating frying oil with a heating element surrounded by a jacket preventing direct contact between the frying oil and the heating element, wherein the jacket transfers heat from the heating element to the frying oil, and wherein the jacket encloses heating media, a stirrer arranged to stir the heating media, and a baffle separating the heating element from the stirrer.

* * * * *